United States Patent [19]

Funayama et al.

[11] Patent Number: 5,894,384
[45] Date of Patent: Apr. 13, 1999

[54] MAGNETORESISTANCE EFFECT HEAD IN WHICH A MAGNETORESISTANCE EFFECT ELEMENT AND A SOFT MAGNETIC FILM FORM A SINGLE MAGNETIC CIRCUIT

[75] Inventors: Tomomi Funayama, Fujisawa; Tadahiko Kobayashi, Yokohama; Hiromi Sakata, Kawasaki; Kohichi Tateyama, Ichikawa, all of Japan

[73] Assignee: Kabushiki Kaisha Toshiba, Kawasaki, Japan

[21] Appl. No.: 08/816,336

[22] Filed: Mar. 13, 1997

[30] Foreign Application Priority Data

Mar. 18, 1996 [JP] Japan ............................ 8-060969

[51] Int. Cl.$^6$ ........................................ G11B 5/127
[52] U.S. Cl. ................................. 360/113; 360/125
[58] Field of Search ........................... 360/113, 125

[56] References Cited

U.S. PATENT DOCUMENTS

| 5,335,127 | 8/1994 | Nagata et al. | 360/113 |
| 5,486,967 | 1/1996 | Tanaka et al. | 360/113 |
| 5,508,868 | 4/1996 | Cheng et al. | 360/113 |
| 5,712,751 | 1/1998 | Yoda et al. | 360/113 |

OTHER PUBLICATIONS

B. Dieny, "Giant magnetoresistance in spin–valve multilayers", (1994) Journal of Magnetism and Magnetic Materials 136, pp. 335–359.

B. Dieny, V.S. Speriosu, S.S.P. Parkin, B.A. Gurney, D.R. Wilhoit, and D. Mauri, "Giant Magnetoresistance in soft ferromagnetic multilayers", (1991), The American Physical Society Vol. 43, No. 1, pp. 1297–1299.

H. Fujimori, S. Mitani, S. Ohnuma, "Tunnel–type GMR in metal–normetal granular alloy thin films", (1995) Materials Science & Engineering B31, pp. 219–223.

Primary Examiner—John H. Wolff
Attorney, Agent, or Firm—Oblon, Spivak, McClelland, Maier & Newstadt, P.C.

[57] ABSTRACT

The magnetic head comprises two magnetoresistance effect elements and a soft magnetic film connecting end portions of the magnetoresistance effect elements with each other. The two magnetoresistance effect elements and the soft magnetic film are arranged in series so as to form a single magnetic circuit, and a magnetic gap is provided in the side of a surface facing a magnetic medium. Magnetic flux from the magnetic medium is introduced into the magnetoresistance effect elements through the magnetic gap. An insulating material may be used to fill the magnetic gap.

3 Claims, 6 Drawing Sheets

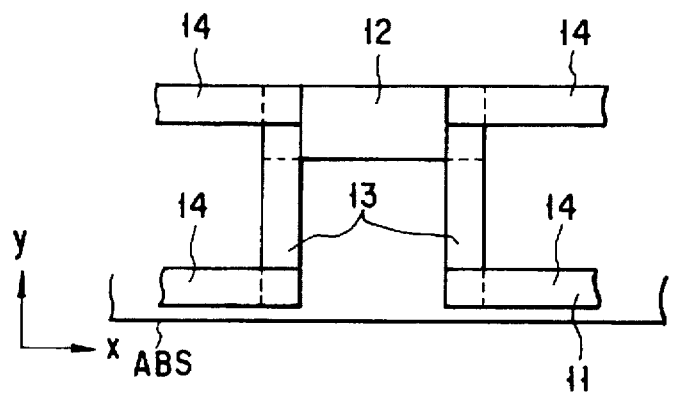
FIG. 1
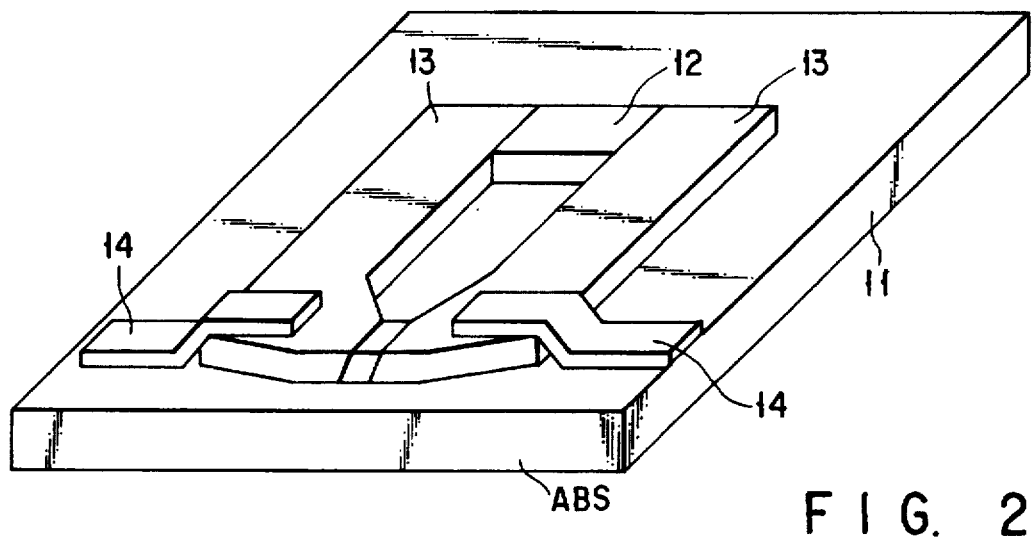
FIG. 2
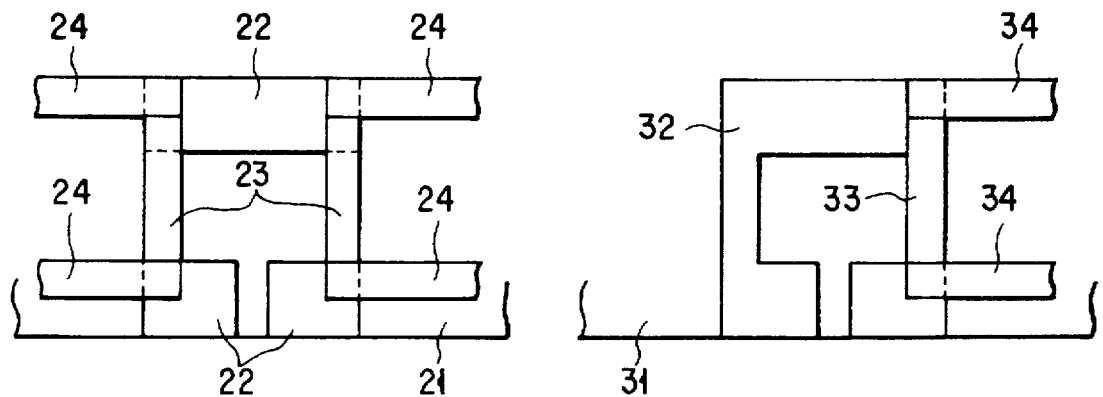
FIG. 3
FIG. 4

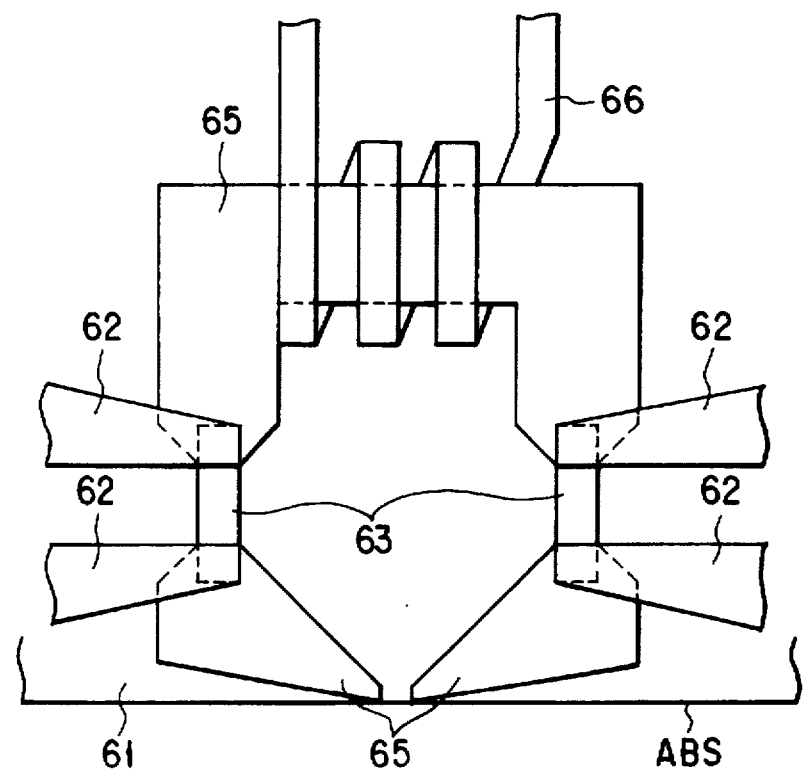
F I G. 8
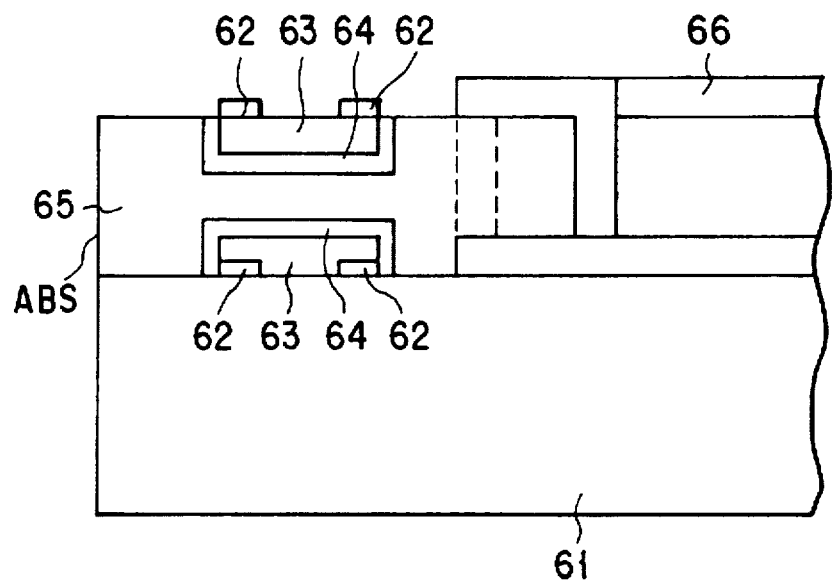
F I G. 9

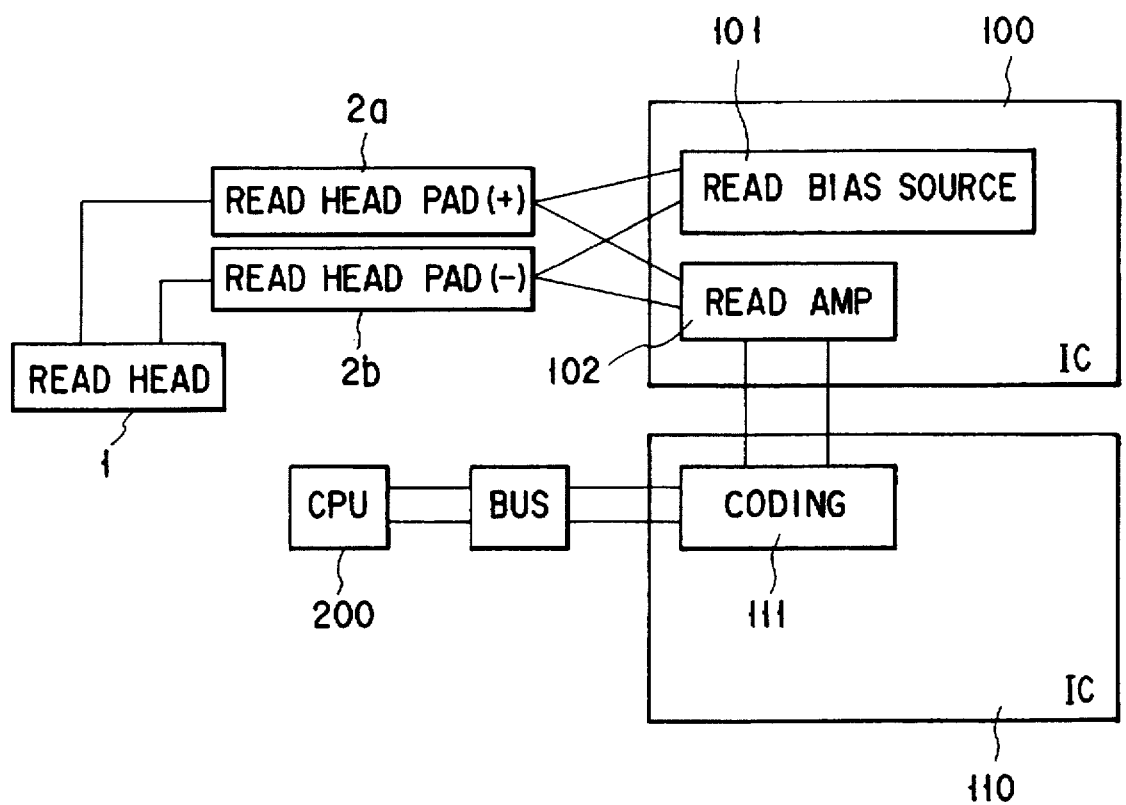
F I G. 15

MAGNETORESISTANCE EFFECT HEAD IN WHICH A MAGNETORESISTANCE EFFECT ELEMENT AND A SOFT MAGNETIC FILM FORM A SINGLE MAGNETIC CIRCUIT

BACKGROUND OF THE INVENTION

The present invention relates to a magnetic head for use in a magnetic disc drive.

In recent years, a reproducting head consisting of a magnetoresistance effect element has been used with use of a hard disc drive or the like has been performed with a higher density. As for the magnetoresistance effect element, attempts have been made to adopt a spin-valve film or an artificial lattice film which generates a giant magnetoresistance effect due to spin-dependent scattering of conduction electrons. In addition, for the purpose of miniaturization of the entire head, developments have been made to an integrated magnetic head which combines a reproduction head comprising a magnetoresistance effect element and a recording head consisting of an induction type magnetic element.

In order to respond to a much higher density with this kind of magnetic head, it is required to reduce the flying height of the head from a recording medium as much as possible, and desirably to make the magnetic head operated in contact wit the recording medium. The lifetime of the magnetoresistance effect element, however, is expected to be extremely shortened due to abrasion when the element is in contact with the recording medium. Therefore, it is desirable to arrange the magnetoresistance effect element apart from the surface which faces the recording medium of the substrate of the reproducing head so that the magnetoresistance effect element might not have a direct contact with the recording medium, and to operate the head by means of a yoke for guiding magnetic flux from the recording medium. In this case, however, there is a problem that the reproducing sensitivity is reduced.

BRIEF SUMMARY OF THE INVENTION

The present invention has an object of providing a magnetic head which prevents reductions in reproducing sensitivity, while avoiding reductions in lifetime of the magnetoresistance effect element due to abrasion. In addition, the present invention has another object of providing a magnetic head in which the size of the entire head is reduced by integrating the reproducing head with the recording head, avoiding reductions in lifetime of the magnetoresistance effect element due to abrasion, and preventing reductions in reproducing sensitivity.

A magnetic head according to the present invention reproduces data recorded on a magnetic recording medium, based on a resistance change of a magnetoresistance effect element, and comprises a magnetoresistance effect element and a soft magnetic film, arranged so as to form a single magnetic circuit, wherein magnetic flux from the medium is introduced into the magnetoresistance effect element through a magnetic gap provided in the magnetic circuit.

For example two or more magnetoresistance effect elements and a soft magnetic film for connecting end portions of the two magnetoresistance effect elements with each other are arranged in series so as to form a single magnetic circuit, and magnetic flux from a medium is introduced into the magnetoresistance effect elements through the magnetic gap provided in the soft magnetic film.

According to the present invention, a recording coil may be provided around the soft magnetic film so that the soft magnetic film serves both as a recording magnetic pole and as a reproducing yoke, to attain a recording/reproducing integrated magnetic head.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a plan view of a magnetic head according to an embodiment 1 of the present invention;

FIG. 2 is a perspective view of a magnetic head according to an embodiment 2 of the present invention;

FIG. 3 is a plan view of a magnetic head according to an embodiment 3 of the present invention;

FIG. 4 is a plan view of a magnetic head according to an embodiment 4 of the present invention;

FIG. 8 is a plan view of a magnetic head according to an embodiment 7 of the present invention;

FIG. 9 is a side view of the magnetic head according to the embodiment 7 of the present invention;

FIG. 15 is a block diagram representing a reproducing system of a hard disk drive.

DETAILED DESCRIPTION OF THE INVENTION

Figure 5:
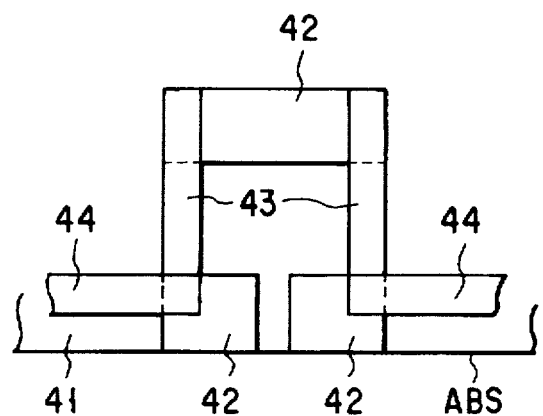
FIG. 5 is a plan view of a magnetic head according to an embodiment 5 of the present invention.

The magnetic head according to the present invention is characterized in that one or a plurality of magnetoresistance effect elements and one or a plurality of soft magnetic films (or reproducing yoke) are arranged so as to form a single magnetic circuit on a substrate and that magnetic flux from a medium is introduced into the magnetoresistance effect elements through a magnetic gap provided in the magnetic circuit. In this arrangement, magnetic losses are small and reductions in sensitivity are prevented in comparison with an arrangement in which the magnetoresistance effect element and soft magnetic film are arranged so as to form a plurality of parallel magnetic circuits. Only the magnetoresistance effect element may be arranged so as to construct a single magnetic circuit. In addition, the size of the entire head can be reduced if a recording/reproducing integrated magnetic head is constructed by providing a recording coil around the soft magnetic film such that the soft magnetic film is used both as a reproducing yoke and a recording pole.

The magnetoresistance effect elements used in the present invention may be of a type using an anisotropic magnetoresistance effect or of a type using a magnetoresistance effect caused by spin-dependent scattering. From the view point of reproducing sensitivity, the latter type called a giant magnetoresistance effect element is preferable. Specifically, a magnetoresistance effect element of a spin-valve structure in which a soft magnetic film, a non-magnetic film and a soft magnetic film are layered. In this case, it is preferable to use a soft magnetic film having a high resistance of heteroamorphous material or ferrite for a free layer of the spin valve film. In addition, a granular GMR (Co—Al—O, etc.) film or a colossal MR film (La—Sr—Mn—O, etc.) having a large magnetoresistance effect and a high resistance may be used.

In the present invention, arrangement of the magnetoresistance effect element and the soft magnetic film is not particularly limited. For example, a magnetoresistance effect element may be arranged so as to cross over separately formed reproducing yokes made of a soft magnetic film. A magnetoresistance effect element may be layered above or under a soft magnetic film, or magnetoresistance effect elements may be layered both above and under a soft magnetic film. Alternatively, the magnetoresistance effect element may be sandwiched between lower and upper soft magnetic films.

In addition, a magnetic gap may be formed by providing a gap between soft magnetic films or between a plurality of magnetoresistance effect elements, in the side of the surface facing a medium (air-bearing surface), on the substrate of a reproducing head. The film thickness of the soft magnetic films or the magnetoresistance effect elements forming the magnetic gap is set so as to correspond to the track width. In particular, in case of defining a magnetic gap by magnetoresistance effect elements, it is preferable to use a granular GMR film or a colossal MR film which has a large magnetoresistance effect and a high resistance. Non-magnetic material is embedded in the magnetic gap. The non-magnetic material may be insulating material such as alumina and silica or conductive metal such as Ta, Si and Ti.

Leads for leading electrodes are formed at both ends of a magnetoresistance element. In case of providing a plurality of magnetoresistance effect elements, the leads may be arranged such that a plurality of magnetoresistance effect elements are connected in series, or may be arranged such that differential detection is enabled. In this case, resistance against electrostatic discharge (from the medium) can be improved by electrically grounding the leads in the side of the air-bearing surface.

The structure in which the soft magnetic film and the magnetoresistance effect element are layered as described above will be described below in more detail.

In this case, an insulating film may be provided between contact surfaces of a magnetoresistance effect element and a soft magnetic film, in order to prevent a sensing current from leaking to the soft magnetic film from the magnetoresistance effect element. However, if the insulating film is of non-magnetic material or does not have an excellent soft magnetic characteristic, reductions in reproducing sensitivity are caused when the film thickness is large, and therefore, the film thickness should be preferably 1 μm or less.

Alternatively, the soft magnetic film and the magnetoresistance effect element may be directly layered on each other. The magnetoresistance effect element is operated by an exchange coupling force with the soft magnetic film. In this case, it is preferable to avoid leakages of a sensing current made flow through the magnetoresistance effect element to the medium side. Hence, an insulating film is inserted in the soft magnetic film provided in the side of the air bearing surface to shut off an electric circuit. In addition, an insulating made of ferrite or the like may be used as a soft magnetic film. In addition, a part of a soft magnetic film formed apart from the air bearing surface may be used as a current path for a sensing current made flow through a magnetoresistance effect element. In this case, the number of leads connected to the magnetoresistance effect element can be reduced, contributing to reductions in size of the entire head.

Further, in case where a soft magnetic film and a magnetoresistance effect element are layered, the cross-sectional area of the portion of the soft magnetic layer where the magnetoresistance effect element is layered should preferably be smaller than the cross-sectional area of the other portion. In this structure, magnetic flux can be concentrated on the magnetoresistance effect element as a magnetic field detecting portion, regardless of the track width, so that the reproducing sensitivity can be improved.

In the present invention, if a soft magnetic film is used both as a recording magnetic pole and as a reproducing yoke, the soft magnetic film may be constructed in a multi-layer structure consisting of two or three or more layers. Specifically, it is possible to consider a structure in which soft magnetic material having a high resistance is used for a portion which is contact with the magnetoresistance effect element, and soft magnetic material having a high saturation magnetic flux density is used for a portion which is not in contact with the magnetoresistance effect element. The former material may be, for example, amorphous material such as Co—Zr—Nb or the like, and the latter material may be, for example, Fe—Zr—N or the like. By using the former material, the reproducing sensitivity can be improved, and leakages of a sensing current can be reduced. By using the latter material, excellent recording characteristics can be achieved. Therefore, by adopting this kind of structure, both of recording and reproducing can be carried out with a high efficiency. In addition, it is preferable that a gap (i.e., a recording gap) formed in the soft magnetic material having a high saturation magnetic flux density is broader than a gap (i.e., a reproducing gap) formed in the soft magnetic material having a high resistance. If the widths of the recording and reproducing gaps are thus defined, it is possible to prevent short-circuiting of magnetic flux during reproducing operation, so that the reproducing sensitivity can be improved.

Further, magnetic shields may be provide above and below a member forming a magnetic gap, in order to reduce cross-talk and to improve off-track profiles.

EXAMPLES

In the following, embodiments of the present invention will be explained with reference to the drawings.

Note that, in the following embodiments, soft magnetic films are made of CoZrNb and magnetoresistance effect element is made of $Co_{90}Fe_{10}/Cu/Co_{90}Fe_{10}/FeMn$ layered films processed stripe-like as long as described otherwise.

Embodiment 1

FIG. 1 is a plan view of a flat reproducing magnetic head in this embodiment 1. In the figure, the reference x indicates the longitudinal direction of tracks of a magnetic recording medium, and the reference y indicates the height direction from the surface of the magnetic recording medium. In FIG. 1, a soft magnetic film (or reproducing yoke) 12 having a rectangular shape is formed on a substrate 11 at a position apart from a surface (air bearing surface) facing a medium (in the lower side of FIG. 1) such that the film 12 is in parallel with the surface facing the medium. Two magnetoresistance effect elements 13 are formed to be perpendicular to the surface facing the medium, such that an end portion of each magnetoresistance element 13 is partially layered on an end portion of the soft magnetic film 12. The soft magnetic film 12 and the magnetoresistance effect elements 13 are substantially U-shaped, as a whole, thereby forming a magnetic circuit, and the gap between the two magnetoresistance effect elements 13 serves as a magnetic gap in the side of the surface facing the medium. In the area of the magnetic gap, there is provided an insulating member (made of, e.g., alumina). In addition, an insulating member (made of, e.g., alumina) as a protect film is provided between the other ends of the magnetoresistance effect elements 13 and the surface facing the medium. Both ends of each magnetoresistance effect element 13 are respectively connected with leads 14 for leading electrodes. These leads 14 are arranged such that the magnetoresistance effect elements 13 are connected in series with each other.

In the flat reproducing magnetic head, a sensing current is made flow to the magnetoresistance effect elements 13. Magnetic flux from a recording medium is guided by the magnetic gap and passes through a magnetic circuit formed by the magnetoresistance effect elements 13 and the soft magnetic film 12, thereby changing the resistance of the magnetoresistance effect elements 13. Changes in resistance of the magnetoresistance effect elements 13 can be read as reproducing signals.

FIG. 15 shows a block diagram of a reproducing system in a general hard disc drive. A read bias source 101 and a read amplifier 102 are incorporated in an IC 100. The read bias source 101 and read amplifier 102 are connected to pads 2a, 2b on the read head 1, respectively. Although there are not shown in the drawing, a write current source and multiplexer for selecting one head among a plurality of heads, etc., are incorporated in the IC 100. The reproducing operation is determined by the IC 100. A sensing current made flow to the magnetoresistance effect element in the read head 1 is supplied from the read bias source 101. The resistance change detected by the magnetoresistance effect element is transferred to an IC 110 for signal processing via the read amplifier 102, converted to 1/0 signal with a coding block 111, and further transferred to CPU 200 through bus.

Embodiment 2

FIG. 2 is a perspective view showing a flat reproducing magnetic head according to the present embodiment. This reproducing magnetic head has the same structure as that shown in FIG. 1, although the shape and material of the magnetoresistance effect elements are changed in view of practical use. In FIG. 2, a soft magnetic film 12 is formed on a substrate 11, in parallel with the air bearing surface. In addition, two magnetoresistance effect elements 13 made of Co—Al—O granular films are formed such that these elements are perpendicular to the air bearing surface and an end portion of each element 13 is in contact with an end portion of the soft magnetic film 12. The soft magnetic film 12 and the magnetoresistance effect elements 13, as a whole, form a magnetic circuit. The gap between the magnetoresistance effect elements 13 in the side of the air bearing surface serves as a magnetic gap, and an insulating member (made of, e.g., alumina) is embedded in the portion of the magnetic gap. In FIG. 2, the magnetoresistance effect elements 13 are processed and shaped so as to form a magnetic gap narrower than that shown in FIG. 1. Further, a lead 14 for leading an electrode is connected to an end of each of the two magnetoresistance effect elements 13.

In this flat reproducing magnetic head, magnetic flux from a recording medium passes through the magnetic circuit formed by the magnetoresistance effect elements 13 and the soft magnetic film 12, thereby changing the resistance of the magnetoresistance effect elements 13. The changes in resistance can be read as reproducing signals. In this case, the magnetoresistance effect elements 13 are made of granular films having a high resistance, and therefore, a sufficient output can be obtained even if the film thickness of each magnetoresistance effect element 13 is formed to be large, in correspondence with the track width.

Note that the soft magnetic film may be replaced with a magnetoresistance effect element and a magnetic circuit may be formed only by magnetic resistance effect elements.

Embodiment 3

FIG. 3 is a plan view showing the flat reproducing magnetic head according to the present embodiment. In FIG. 3, rectangular soft magnetic films 22 are formed at a position apart from the air bearing surface and at another position in the side of the air bearing surface, such that the films 22 are in parallel with the air bearing surface. Of these films, a center portion is removed from the soft magnetic film 22 in the side of the air bearing surface, thereby forming a magnetic gap. In addition, two rectangular magnetoresistance effect elements 23 are formed on a substrate 21 such that these elements are perpendicular to the air bearing surface and that both end portions of each element 23 are respectively layered on end portions of the soft magnetic films 22 formed at the position apart from the air bearing surface and in the side of the air bearing surface. The soft magnetic films 22 and the magnetoresistance effect elements 23, as a whole, form a ring-like shape, thereby constituting a magnetic circuit. Both ends of each of the two magnetoresistance effect elements 23 are respectively connected with leads 24, and these leads 24 are arranged such that the magnetoresistance effect elements 23 are connected in series. With this flat reproducing magnetic head, reproducing can be performed in accordance with the same principle as that of the embodiment 1.

Embodiment 4

FIG. 4 is a plan view of a flat reproducing magnetic head according to the present embodiment. In FIG. 4, a ring-like soft magnetic film 32 is formed on a substrate 31, and a center portion of the side of the film 32 facing a medium is removed, thereby forming a magnetic gap. In addition, a magnetoresistance effect element 33 is layered on the soft magnetic film 32 such that the element 33 is perpendicular to the air bearing surface. Leads 34 are connected to both ends of the magnetoresistance effect element 33.

In this flat reproducing magnetic head, magnetic flux from a recording medium is guided by a magnetic gap and passes through a magnetic circuit formed by the soft magnetic film 32, thereby rotating the magnetization of the soft magnetic film 32. In addition, the magnetization of the magnetoresistance effect element 33 is rotated due to exchange coupling between the soft magnetic film 32 and the magnetoresistance effect element 33 layered thereon. As a result of this, the resistance of the magnetoresistance effect element 33 changes. Changes in resistance can be read as reproducing signals.

Embodiment 5

FIG. 5 is a plan view of a flat reproducing magnetic head according to the present embodiment. In FIG. 5, rectangular soft magnetic films 42 are formed on a substrate 41 at a position apart from the air bearing surface and at another position in the side of the air bearing surface, such that the films 42 are in parallel with the air bearing surface. Of these films, a center portion is removed from the soft magnetic film 42 in the side of the air bearing surface, thereby forming a magnetic gap. In addition, two rectangular magnetoresistance effect elements 43 are formed such that these elements are perpendicular to the air bearing surface and that both end portions of each element 43 are respectively layered on end portions of the soft magnetic films 42 formed at the position apart from the air bearing surface and in the side of the air bearing surface. The soft magnetic films 42 and the magnetoresistance effect elements 43, as a whole, form a ring-like shape, thereby constituting a magnetic circuit. End portions of the two magnetoresistance effect elements 43 in the sides of the air bearing surface are respectively connected with leads 44. In this case, the soft magnetic film 42 at the position apart from the air bearing surface is used as a path of a sensing current of the magnetoresistance effect element 43.

In this flat reproducing magnetic head, reproducing is carried out by the same principle as that of the embodiment 1. In this structure, a part of a soft magnetic film 42 is used as a path for a sensing current. Therefore, it is unnecessary to form a lead for connecting two magnetoresistance effect elements with each other, so that the structure is made simple. Therefore, the size of the entire head can be reduced. In addition, when a sensing current flows through a part of the soft magnetic film 42, a bias magnetic field is applied to the part, so that movement of magnetic domain can be restricted by controlling magnetic anisotropy. As a result, magnetic stability can be improved.

Embodiment 6

Figure 6:
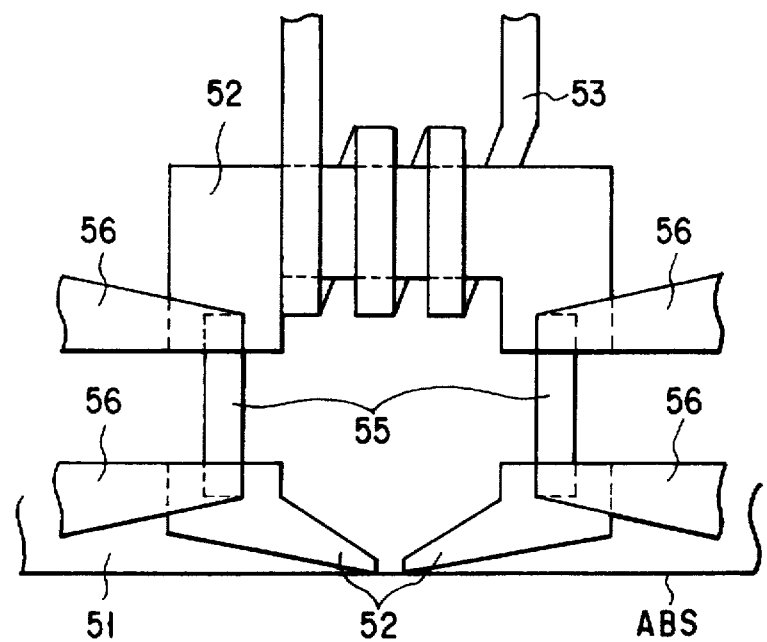
FIG. 6 is a plan view of a magnetic head according to an embodiment 6 of the present invention.
Figure 7:
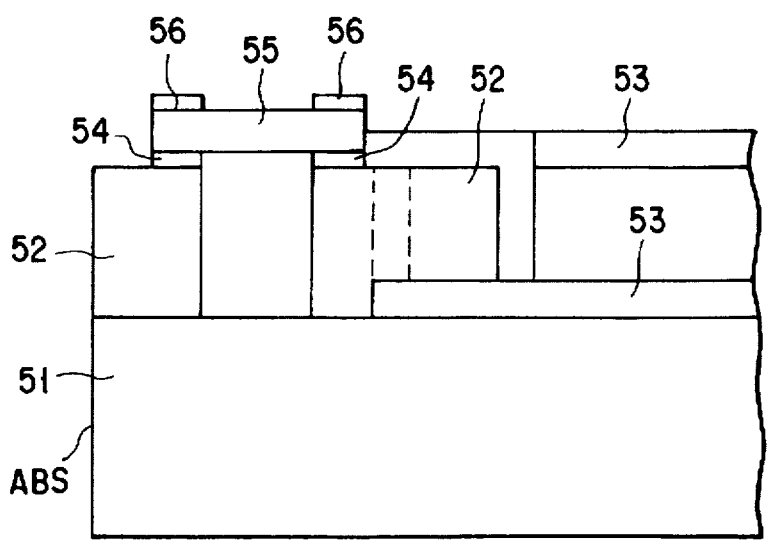
FIG. 7 is a side view of the magnetic head according to the embodiment 6 of the present invention.

FIG. 6 is a plan view of a flat recording/reproducing integral magnetic head according to the present embodiment, and FIG. 7 is a side view of the head. In FIGS. 6 and 7, a ring-like soft magnetic film 52 is formed on a substrate 51. A center portion of the film 52 in the side of the air bearing surface of the substrate (e.g., in the lower side of FIG. 6 and in the left-hand side of FIG. 7) is removed, thereby forming a magnetic gap, and two parts of the film 52 perpendicular to the air bearing surface are removed. A recording coil 53 made of Cu is formed around the portion of the soft magnetic film 52 positioned apart from the air bearing surface. In addition, two rectangular magnetoresistance effect elements 55 are formed on the soft magnetic film 52 with an insulating film 54 interposed therebetween, such that the elements 55 respectively cross over the two removed parts of the portions of the soft magnetic film 52 which are perpendicular to the air bearing surface. Both ends of each of the two magnetoresistance effect elements 55 are respectively connected with leads 56, and these leads 56 are arranged such that the magnetoresistance effect elements 55 are connected in series.

In this magnetic head, the soft magnetic film 52 serves both as a recording magnetic pole and as a reproducing yoke. Specifically, when a current is made flow through the recording coil 53, magnetic flux thereby generated passes through the soft magnetic film 52 and the magnetoresistance effect elements 55 and leaks to the recording medium from the magnetic gap formed in the side of the air bearing surface, thereby achieving recording. In addition, magnetic flux from the recording medium passes through a magnetic circuit formed by the soft magnetic film 52 and the magnetoresistance effect elements 55 during reproducing operation. As a result of this, the resistance of the magnetoresistance effect elements 55 is changed. Changes in resistance can be read as reproducing signals.

Embodiment 7

FIG. 8 is a plan view of a flat recording/reproducing integral magnetic head according to the present embodiment, and FIG. 9 is a side view of the head. In FIGS. 8 and 9, leads 62, two magnetoresistance effect elements 63 perpendicular to an air bearing surface, and insulating films 64 are sequentially formed on a substrate 61. In addition, a ring-like soft magnetic film 65 is formed on the substrate 61 including the insulating films 64, and a center portion in the side of the air bearing surface is removed, thereby forming a magnetic gap. A recording coil 66 made of Cu is formed around a portion of the soft magnetic film 65 at a position apart from the air bearing surface. Recesses are formed in the soft magnetic film 65 at two portions above and corresponding to the magnetoresistance effect elements 63, and the insulating films 64 and the upper magnetoresistance effect elements 63 are embedded in the recesses. Further, both ends of each upper magnetoresistance effect element 63 are respectively connected with the leads 62. These leads are arranged such that the magnetoresistance effect elements 63 are connected in series.

In this magnetic head, recording and reproducing are carried out according to the same principle as that of the embodiment 6. Further, the density of magnetic flux introduced from a recording medium during reproducing operation is increased at a portion of the soft magnetic film 65 sandwiched between the magnetoresistance effect elements 63 and of a smaller cross-sectional area than that of any other portion. Therefore, reproducing signals can be read more efficiently than in the case of the embodiment 6.

Embodiment 8

Figure 10:
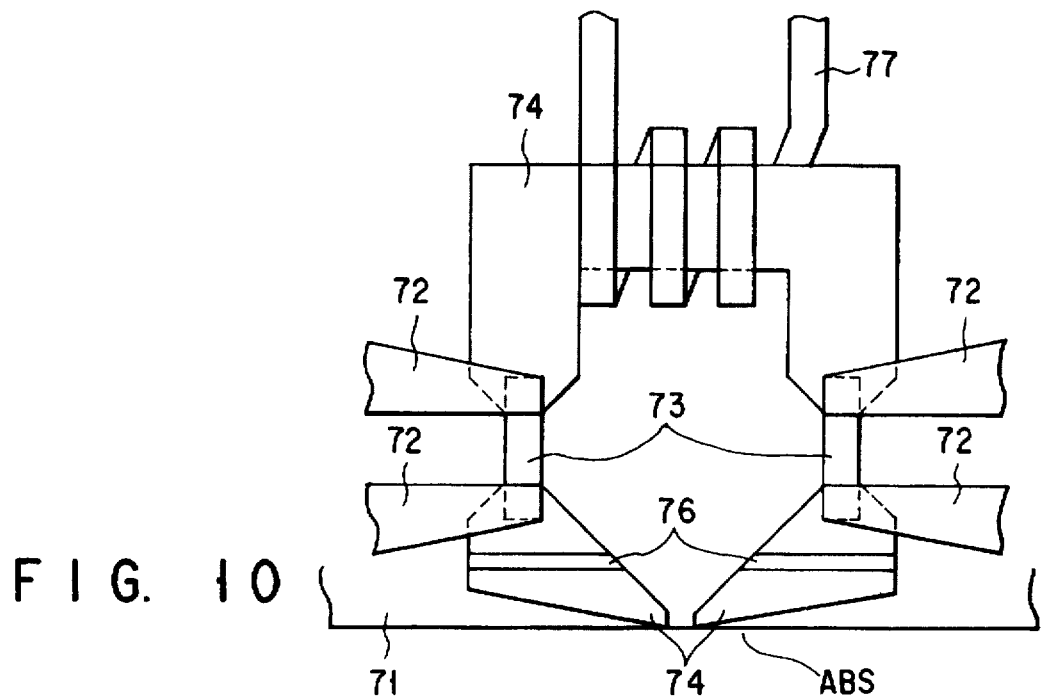
FIG. 10 is a plan view of a magnetic head according to an embodiment 8 of the present invention.
Figure 11:
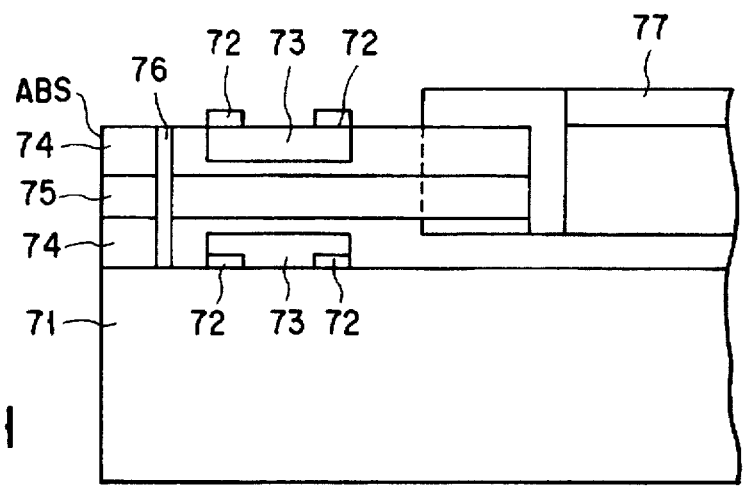
FIG. 11 is a side view of the magnetic head according to the embodiment 8 of the present invention.
Figure 12:
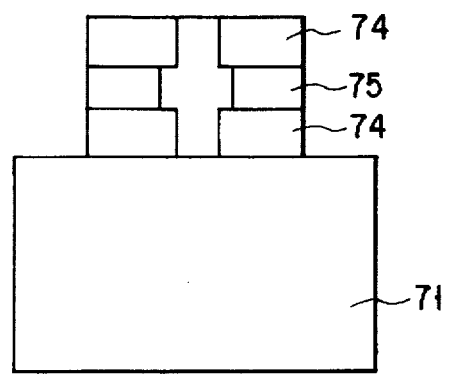
FIG. 12 is an end surface view of the magnetic head according to the embodiment 8 of the present invention, viewed from the medium side.

FIG. 10 is a plan view of a flat recording/reproducing integral magnetic head according to the present embodiment. FIG. 11 is a side view of the head and FIG. 12 is an end surface view of the head viewed from the medium side. In FIGS. 10 to 12, leads 72 and two magnetoresistance effect elements 73 perpendicular to the air bearing surface are sequentially formed on a substrate 71. In addition, a soft magnetic film of a three-layered structure consisting of a soft magnetic film 74 having a high resistance, a soft magnetic film 75 having a high saturation magnetic flux density, and a soft magnetic film 74 having a high resistance is formed on the substrate 71 to have a ring-like shape. A center portion in the side of the air bearing surface is removed, thereby forming a magnetic gap. The soft magnetic film having the three-layered structure is made of, for example, CoZrNb/FeZrN/CoZrNb. Note that the magnetic gap is wide in the soft magnetic film 75 having a high saturation magnetic flux density and is narrow in the soft magnetic films 74 having a high resistance, as shown in FIG. 12. That parts of the soft magnetic film having the three-layered structure which are close to the air bearing surface are removed, and insulating films 76 are embedded therein. By thus providing the insulating films 76, leakages of a sensing current made flow through the magnetoresistance effect elements 73 can be avoided. A recording coil 77 made of Cu is formed at a portion of the soft magnetic film at a position apart from the air bearing surface. Recesses are respectively formed in those two portions of the upper soft magnetic film 74 having a high resistance and forming part of the soft magnetic film, which are situated above the magnetoresistance effect elements 73. The upper magnetoresistance effect elements 73 are embedded in these recesses, and further, both ends of each of the upper magnetoresistance effect elements 73 are respectively connected with the leads 72. The leads 72 are arranged such that the magnetoresistance effect elements 73 are connected in series.

In this magnetic head, when a current is made flow through the recording coil 77, magnetic flux thereby generated passes through the soft magnetic film and the magnetoresistance effect elements 73, and leaks to a recording medium from a magnetic gap provided in the side of the air bearing surface. In this case, a soft magnetic film (made of FeZrN) 75 having a high saturation magnetic flux density is used for the center portion of the soft magnetic film having the three-layered structure, and therefore, the recording efficiency is improved.

In addition, magnetic flux introduced from a recording medium during reproducing operation passes mainly through the soft magnetic films 74 (made of CoZrNb) having a high resistance, and the magnetization of the magnetoresistance effect elements is rotated due to exchange coupling between the soft magnetic films 74 having a high resistance and the magnetoresistance effect elements 73, thereby changing the resistance. Changes in resistance can be read as reproducing signals.

Further, the magnetic gap of the soft magnetic film 75 (made of FeZrNb) having a high saturation magnetic flux density, which mainly performs recording operation, is wider than the magnetic gaps of the soft magnetic films 74 (made of CoZrNb) having a high resistance, which mainly perform reproducing operation. Therefore, a short-circuit route is difficult to occur for the magnetic flux passing through the gaps during self-recording/reproducing operation. Therefore, losses are reduced and the reproducing efficiency is improved.

Embodiment 9

Figure 13:
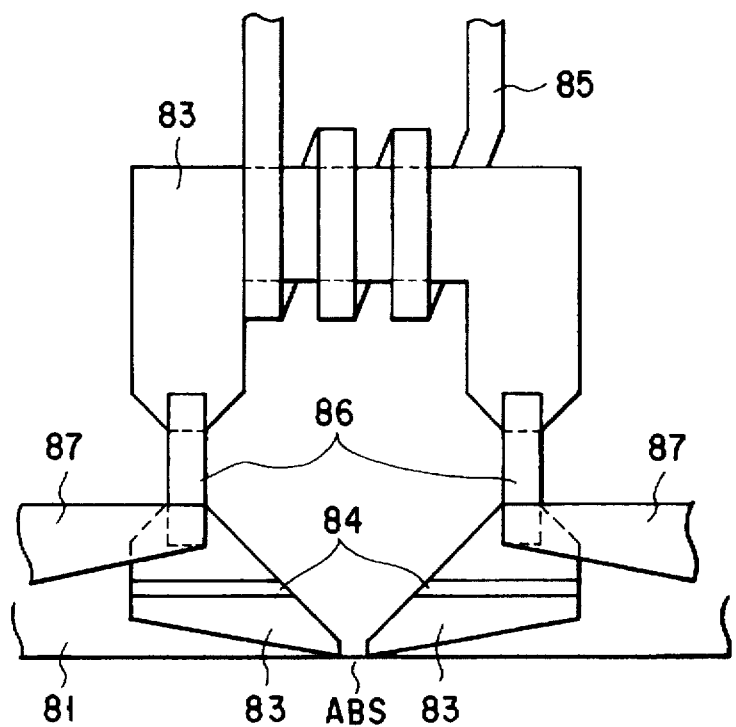
FIG. 13 is a plan view of a magnetic head according to an embodiment 9 of the present invention.
Figure 14:
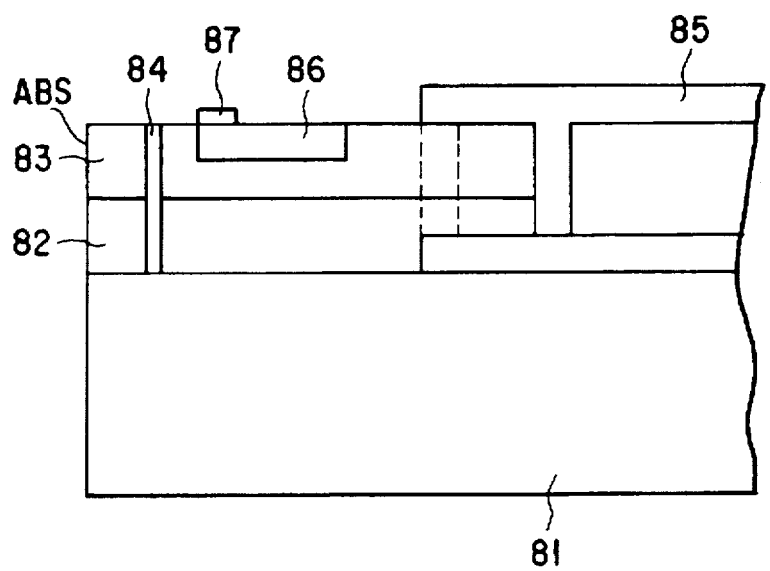
FIG. 14 is a side view of the magnetic head according to the embodiment 9 of the present invention.

FIG. 13 is a plan view of a flat recording/reproducing integral magnetic head according to the present embodiment, and FIG. 14 is a side view of the head. In FIGS. 13 and 14, a soft magnetic film having a two-layered structure consisting of a soft magnetic film 82 having a high saturation magnetic flux density and a soft magnetic film 83 having a high resistance is formed on a substrate 81 in a ring-like shape. The soft magnetic film having the two-layered structure is formed of, for example, FeZrN/CoZrNb. Two parts of the soft magnetic film having the two-layered structure close to the air bearing surface are removed, and insulating films 84 are embedded therein. A recording coil 85 made of Cu is formed around a portion of the soft magnetic film at a position apart from the air bearing surface. Recesses are respectively formed in those two portions of the upper soft magnetic film 83 having a high resistance and forming part of the soft magnetic film, which are perpendicular to the air bearing surface. Upper magnetoresistance effect elements 86 are embedded in the recesses. Further, leads 87 are respectively connected to end portions of the magnetoresistance effect elements 86 in the side of the air bearing surface.

In this structure, the soft magnetic film positioned apart from the air bearing surface is used as a path for a sensing current. Therefore, it is not necessary to form a lead for connecting the two magnetoresistance elements with each other, and the structure becomes thus simple, so that the size of the entire head can be reduced. Further, when a sensing current flows through a part of the soft magnetic film, a bias magnetic field is applied to that part, so that the magnetic anisotropy can be controlled to restrict movement of magnetic domain. Magnetic stability can thus be improved.

In this magnetic head, when a current is made flow through the recording coil 85, magnetic flux thereby generated passes through the soft magnetic film having a two-layered structure and the magnetoresistance effect elements 86 and leaks to a recording medium from a magnetic gap provided in the side of the air bearing surface, thereby performing recording operation. In this case, the recording efficiency is improved since a soft magnetic film 82 (made of FezrN) having a high saturation magnetic flux density is used for the lower portion of the soft magnetic film having a two-layered structure.

In addition, magnetic flux introduced from a recording medium passes mainly through a soft magnetic film 83 (made of CoZrNb) of the soft magnetic films forming the two-layered structure. In this case, magnetization of the magnetoresistance effect elements 86 is rotated due to exchange coupling between the soft magnetic film 83 having a high resistance and the magnetoresistance effect elements 86, thereby changing the resistance. Changes in resistance can be read as reproducing signals.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A magnetic head for reproducing data recorded on a magnetic recording medium, based on a resistance change of a magnetoresistance effect element, comprising:

two magnetoresistance effect elements and a soft magnetic film, arranged in a shape like a flat ring core, so as to form a single magnetic circuit, wherein magnetic flux from the medium is introduced into said magnetoresistance effect elements through a magnetic gap between said two magnetoresistance effect elements.

2. The magnetic head according to claim 1, wherein said magnetoresistance effect element consists of a granular film in which soft magnetic grains are dispersed in a non-magnetic base material.

3. The magnetic head according to claim 1, wherein said soft magnetic film is used as a path for a sensing current for said magnetoresistance effect elements.

* * * * *